United States Patent
Li et al.

(10) Patent No.: US 8,576,495 B2
(45) Date of Patent: Nov. 5, 2013

(54) ZOOM LENS AND IMAGING DEVICE USING SAME

(75) Inventors: Zi-Yuan Li, Guangdong (CN); Jun-Jie Li, Guangdong (CN); Jian-Jun Zhang, Guangdong (CN); Li-Hui He, Guangdong (CN); Quan-Long Tang, Guangdong (CN); Xiao-Tian Kang, Guangdong (CN)

(73) Assignees: Premier Image Technology (China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 87 days.

(21) Appl. No.: 13/427,916

(22) Filed: Mar. 23, 2012

(65) Prior Publication Data

US 2013/0141799 A1 Jun. 6, 2013

(30) Foreign Application Priority Data

Dec. 1, 2011 (CN) .......................... 2011 1 0392714

(51) Int. Cl.
*G02B 15/14* (2006.01)
(52) U.S. Cl.
USPC ........................................................ 359/695
(58) Field of Classification Search
USPC .................................................. 359/694–704
See application file for complete search history.

(56) References Cited

U.S. PATENT DOCUMENTS

| 2007/0097532 A1* | 5/2007 | Kuo et al. ..................... 359/823 |
| 2011/0032626 A1* | 2/2011 | Tsuji ............................. 359/699 |

\* cited by examiner

*Primary Examiner* — James Jones
(74) *Attorney, Agent, or Firm* — Altis & Wispro Law Group, Inc.

(57) ABSTRACT

A zoom lens includes a first lens unit, a second lens unit, a third lens unit and a fourth lens unit. The third lens unit includes a movable barrel, a first slidable member able to move in a first direction perpendicular to the optical axis, and a second slidable member able to move along a second direction perpendicular to the optical axis and also perpendicular to the first direction. The movable barrel includes a first Hall member and a first coil, the first slidable member comprises a second Hall member and a second coil. A first magnet is aligned with the first coil, and a second magnet is aligned with the second coil, both coils can be independently energized to compensate any shaking movements experienced by the Hall members.

11 Claims, 13 Drawing Sheets

ZOOM LENS AND IMAGING DEVICE USING SAME

BACKGROUND

1. Technical Field

The present disclosure relates to zoom lenses and imaging devices, and particularly, relates to a zoom lens and an imaging device with image stabilizing function.

2. Description of Related Art

Many imaging devices, such as digital cameras, digital video cameras, and monitoring devices, have image stabilizing function for correcting image blur due to shaking of the imaging device during shooting.

An imaging device with image stabilizing function will include a shake detecting unit for detecting any shaking of the imaging device, a calculating unit for calculating the degree of the shaking, and a blur correcting unit with a compensating lens for correcting image blur due to the shaking. However, the detecting unit, the calculating unit and the blur correcting unit each have a complicated structure and add to the overall complexity of the imaging device, and increase the overall size of the imaging device.

Therefore, it is desirable to provide a zoom lens and an imaging device which can overcome the limitations described above.

BRIEF DESCRIPTION OF THE DRAWINGS

The components of the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

Embodiments of the disclosure will be described with reference to the accompanying drawings.

Figure 1:
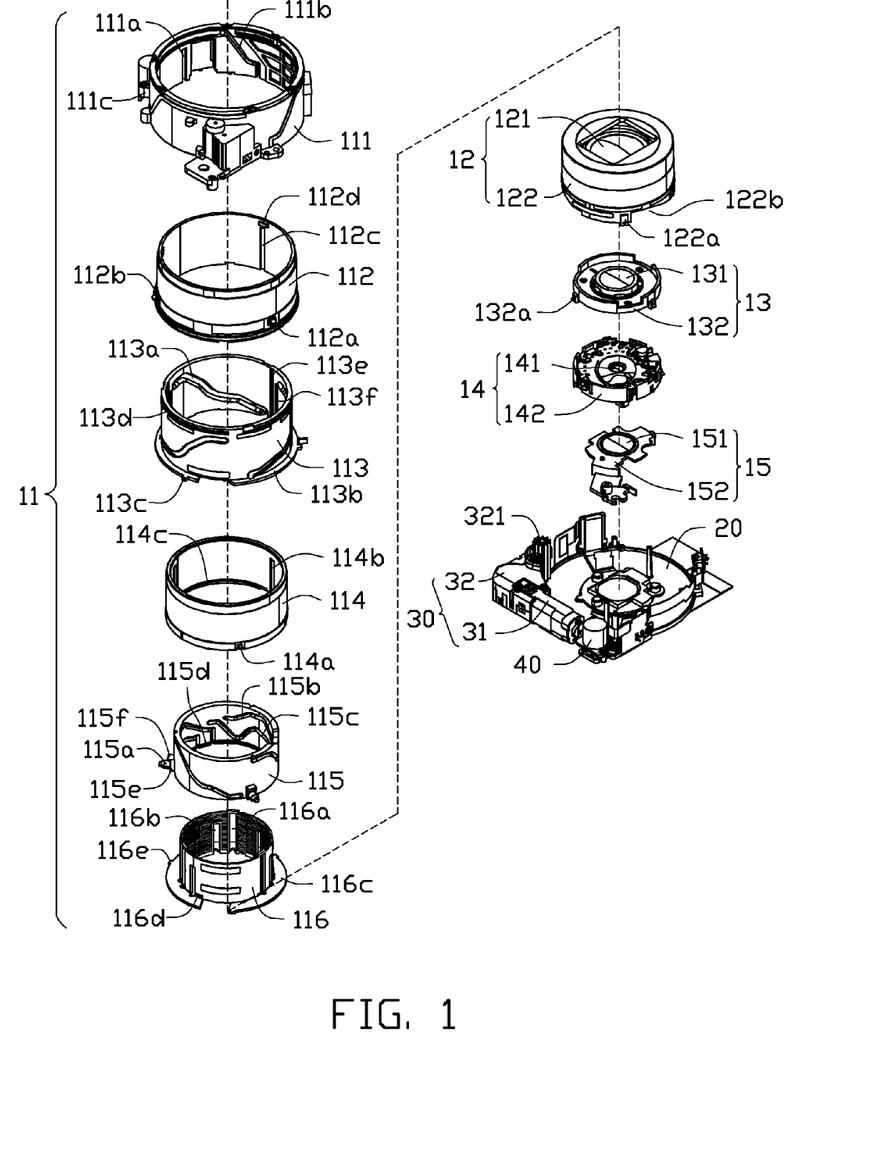
FIG. 1 is an exploded view of an imaging device in accordance with a first exemplary embodiment of the present disclosure, the imaging device including a fixed barrel, a gear barrel, an outer guiding barrel, a front guiding barrel, a cam barrel, an inner guiding barrel, a first lens unit and a third lens unit.
Figure 5:
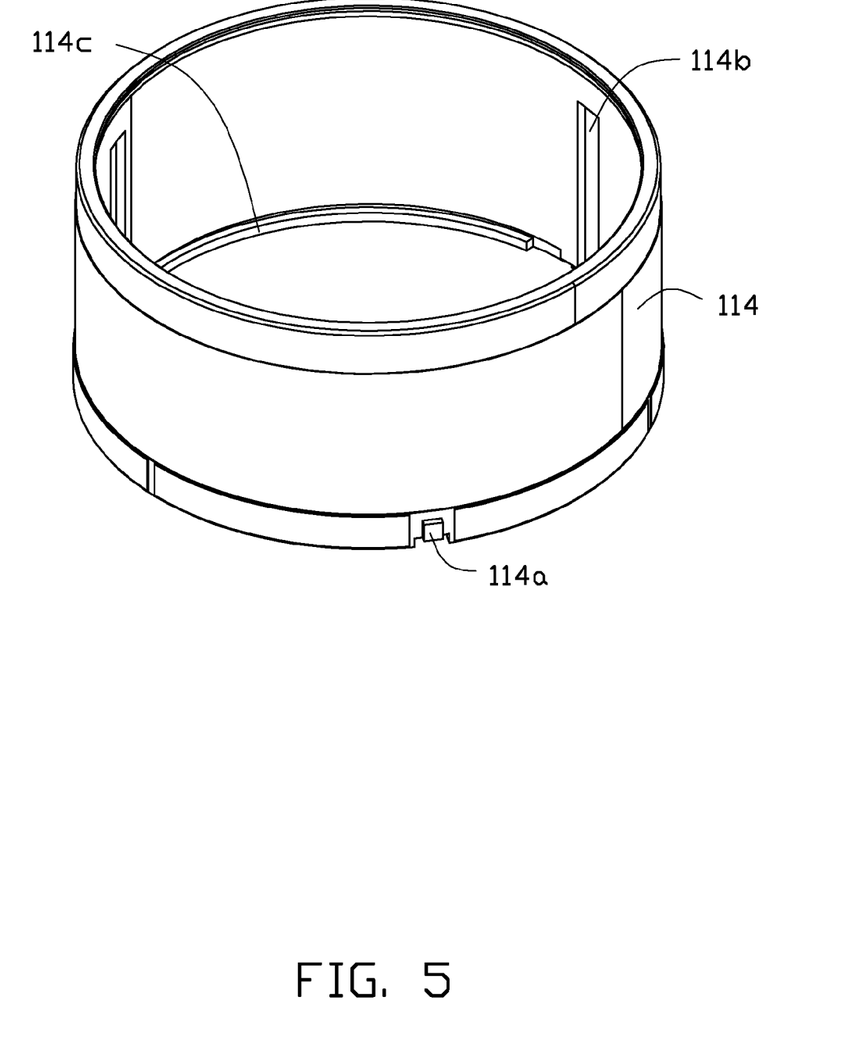
FIG. 5 is an enlarged view of the front guiding barrel of the imaging device of FIG. 1.

Referring to FIG. 1 and FIG. 5, an imaging device 100, according to a first exemplary embodiment, includes a zoom lens 10 for capturing images of objects, an image sensing module 20 for sensing the images captures by the zoom lens 10, a first driving unit 30 and a second driving unit 40.

The zoom lens 10 includes, from an object side to an image side, a lens barrel unit 11, a first lens unit 12, a second lens unit 13, a third lens unit 14 and a fourth lens unit 15. The first lens unit 12, the second lens unit 13, the third lens unit 14 and the fourth lens unit 15 are aligned with each other from the object side to the image side along one optical axis.

The lens barrel unit 11 includes a fixed barrel 111, a gear barrel 112, an outer guiding barrel 113, a front guiding barrel 114, a cam barrel 115 and an inner guiding barrel 116.

Figure 2:
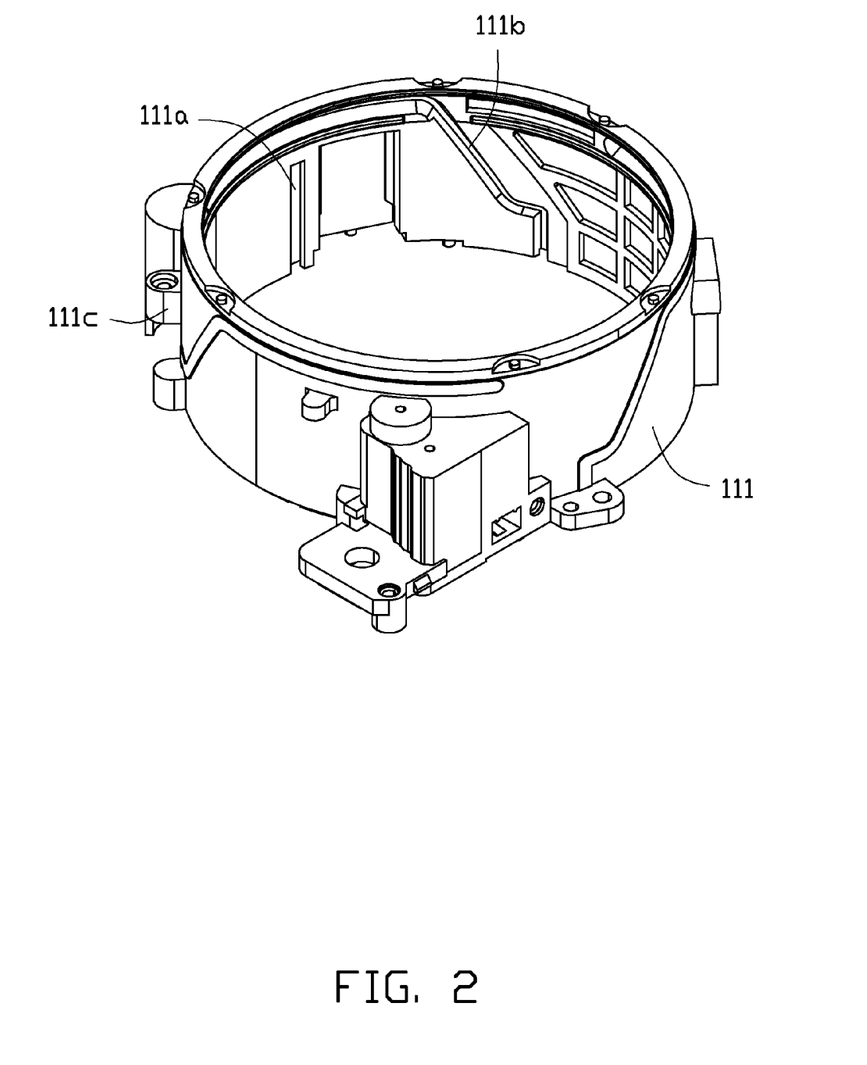
FIG. 2 is an enlarged view of the fixed barrel of the imaging device of FIG. 1.

Referring also to FIG. 2, the fixed barrel 111 defines a number of first straight guiding grooves 111a and a number of first inclined guiding grooves 111b. The straight guiding grooves 111a extend along a direction that is substantially parallel to the optical axis, and the first inclined guiding grooves 111b represent straight lines which have been imposed on a cylinder standing vertically, where each line is slanted at a single predetermined angle from the vertical (in the following description, the words "straight" and "inclined" respectively have the same meaning as used here). The fixed barrel 111 further defines an entrance 111c in the side surface thereof for allowing the first driving unit 30 to enter into the fixed barrel 111.

Figure 3:
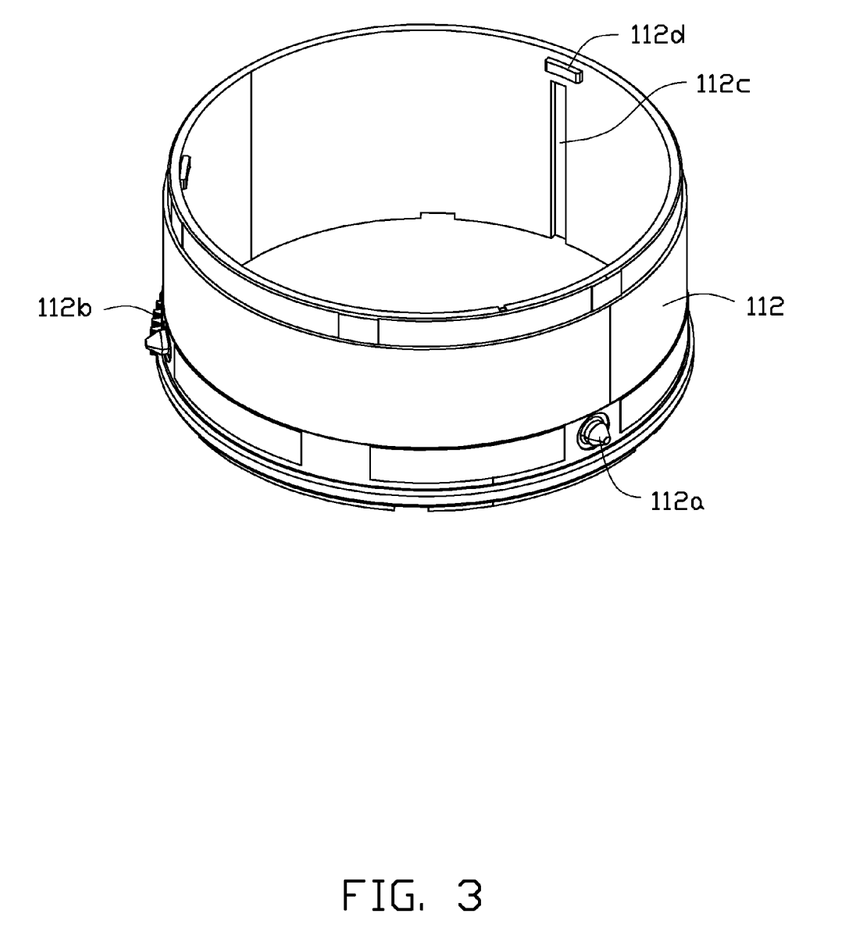
FIG. 3 is an enlarged view of the gear barrel of the imaging device of FIG. 1.

The outer diameter of the gear barrel 112 is less than the inner diameter of the fixed barrel 111. Referring also to FIG. 3, the gear barrel 112 includes a number of first protrusions 112a and a teeth portion 112b. The first protrusions 112a are formed on an outer surface of the gear barrel 112 nearby an object side end of the gear barrel 112. The teeth portion 112b is formed on the outer surface of the gear barrel 112 and extends a distance along a circumferential direction of the gear barrel 112. In this embodiment, the length of the teeth portion 112b is substantially one third of the outer perimeter of the gear barrel 112. The gear barrel 112 defines a number of second straight guiding grooves 112c in the inner surface thereof. The gear barrel 112 includes a number of first engaging blocks 112d formed on the inner surface thereof. In this embodiment, each first engaging block 112d corresponds to a second straight guiding groove 112c, and each first engaging block 112d is positioned at an end of a corresponding second straight guiding groove 112c towards the object side.

Figure 4:
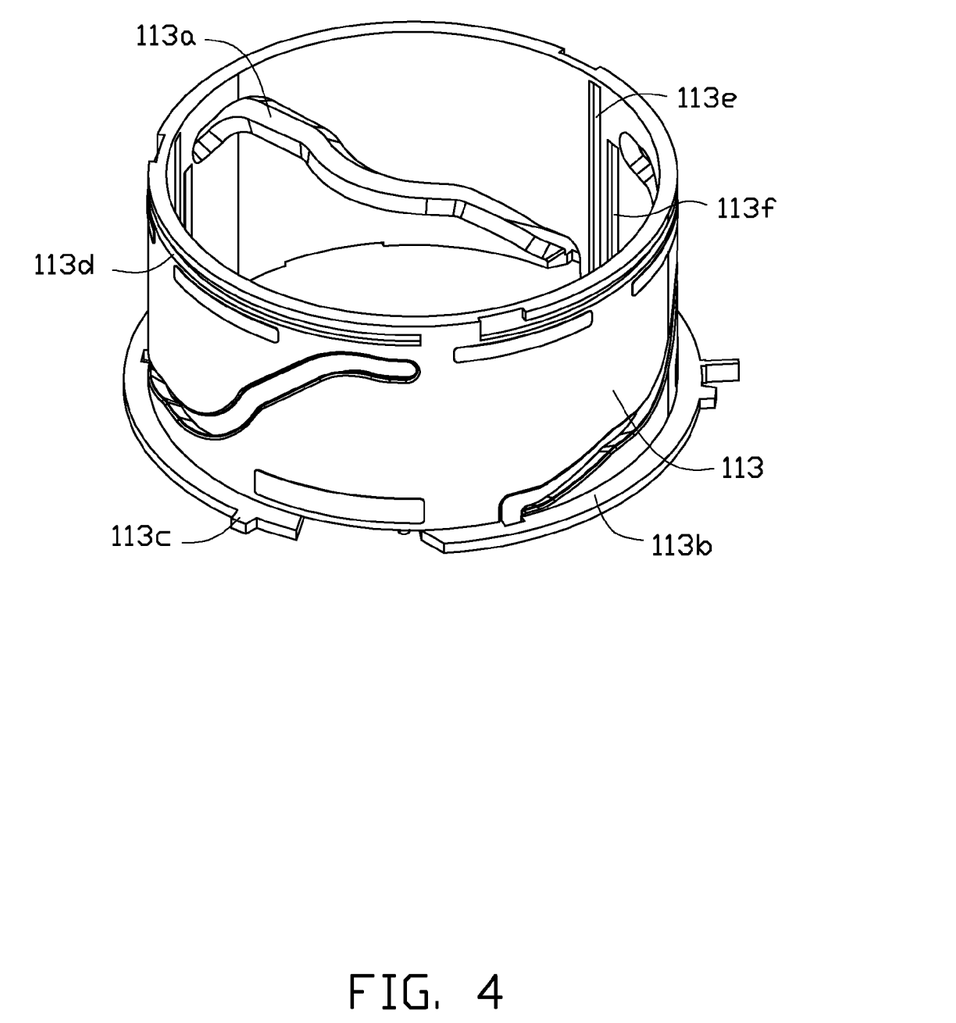
FIG. 4 is an enlarged view of the outer guiding barrel of the imaging device of FIG. 1.

The outer diameter of the outer guiding barrel 113 is less than the inner diameter of the gear barrel 112. Referring also to FIG. 4, the outer guiding barrel 113 defines a number of through second inclined guiding grooves 113a each corresponding to a second straight guiding groove 112c. The outer guiding barrel 113 includes a first stop plate 113b formed on an end thereof towards the image side. The first stop plate 113b includes a number of second protrusions 113c formed on a peripheral edge thereof corresponding to the first straight guiding grooves 111a. The outer guiding barrel 113 defines a first engaging groove 113d in the outer surface thereof corresponding to the first engaging blocks 112d. The engaging groove 113d is positioned at an end of the outer guiding barrel 113 towards the object side. The outer guiding barrel 113 further defines a number of third straight guiding grooves 113e and a number of fourth straight guiding grooves 113f in an inner surface thereof.

The outer diameter of the front guiding barrel 114 is less than the inner diameter of the outer guiding barrel 113. Referring also to FIG. 5, the front guiding barrel 114 includes a number of guiding blocks 114a formed on an outer surface thereof, and the guiding blocks 114a are near an end of the front guiding barrel 114 towards the image side. The front guiding barrel 114 defines a number of fifth straight guiding grooves 114b and a number of second engaging grooves 114c in an inner surface thereof. The second engaging grooves 114c are at an end of the front guiding barrel 114 towards the image side.

Figure 6:
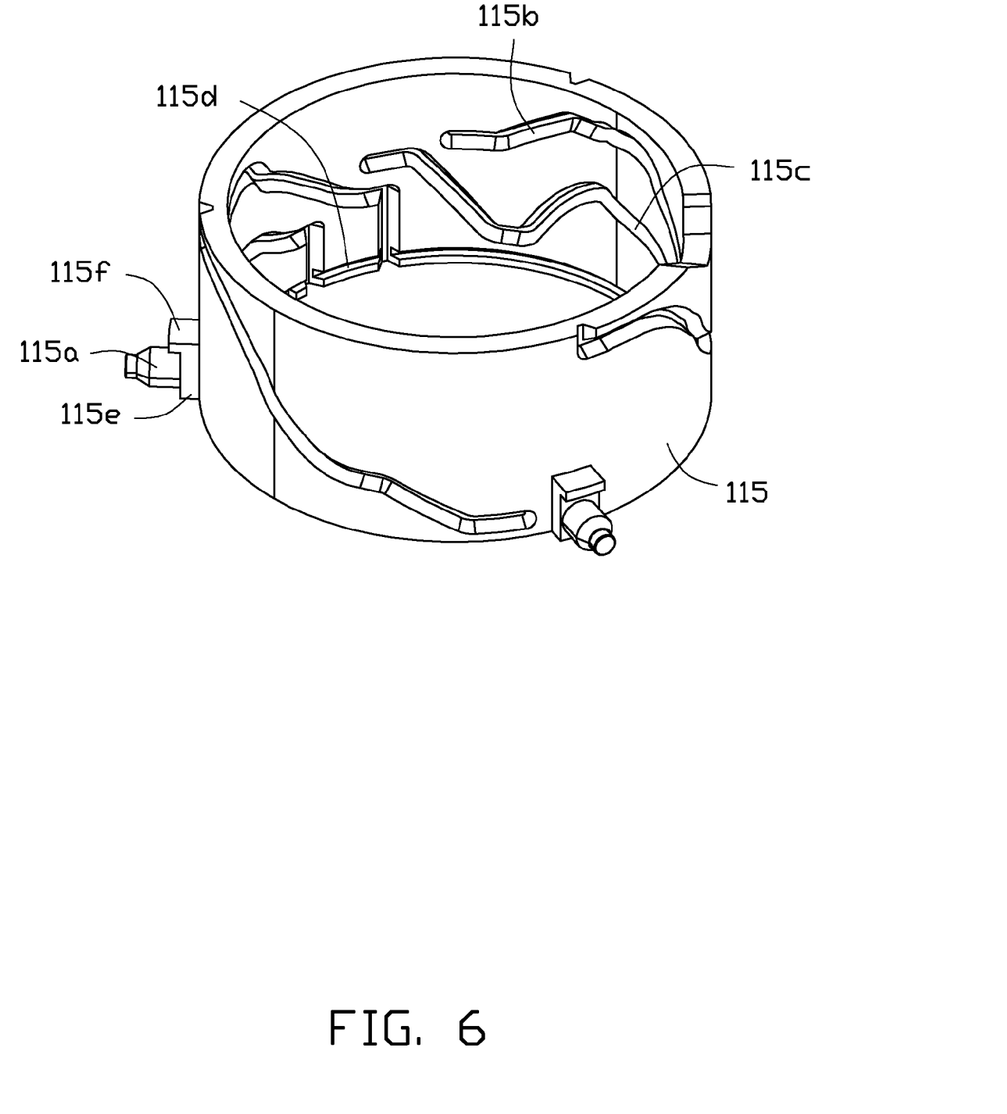
FIG. 6 is an enlarged view of the cam barrel of the imaging device of FIG. 1.

The outer diameter of the cam barrel 115 is less than the inner diameter of the front guiding barrel 114. Referring also to FIG. 6, the cam barrel 115 includes a number of third protrusions 115a formed on an outer surface thereof each corresponding to a second inclined guiding groove 113a and a second straight guiding groove 112c. The third protrusions 115a are positioned at an end of the cam barrel 115 towards the image side. The cam barrel 115 defines a number of first lens guiding grooves 115b for guiding the second lens unit 13, a number of second lens guiding grooves 115c for guiding the third lens unit 14, and a third engaging groove 115d. The first lens guiding grooves 115b are at the object side of the second lens guiding grooves 115c. The third engaging groove 115d extends around the circumference of the cam barrel 115, at an end of the cam barrel 115 towards the image side. The cam barrel 115 includes a number of connecting blocks 115e each formed between a second protrusion 115a and the outer surface of the cam barrel 115. The connecting blocks 115e each include a second engaging block corresponding to a second engaging groove 114c.

Figure 7:
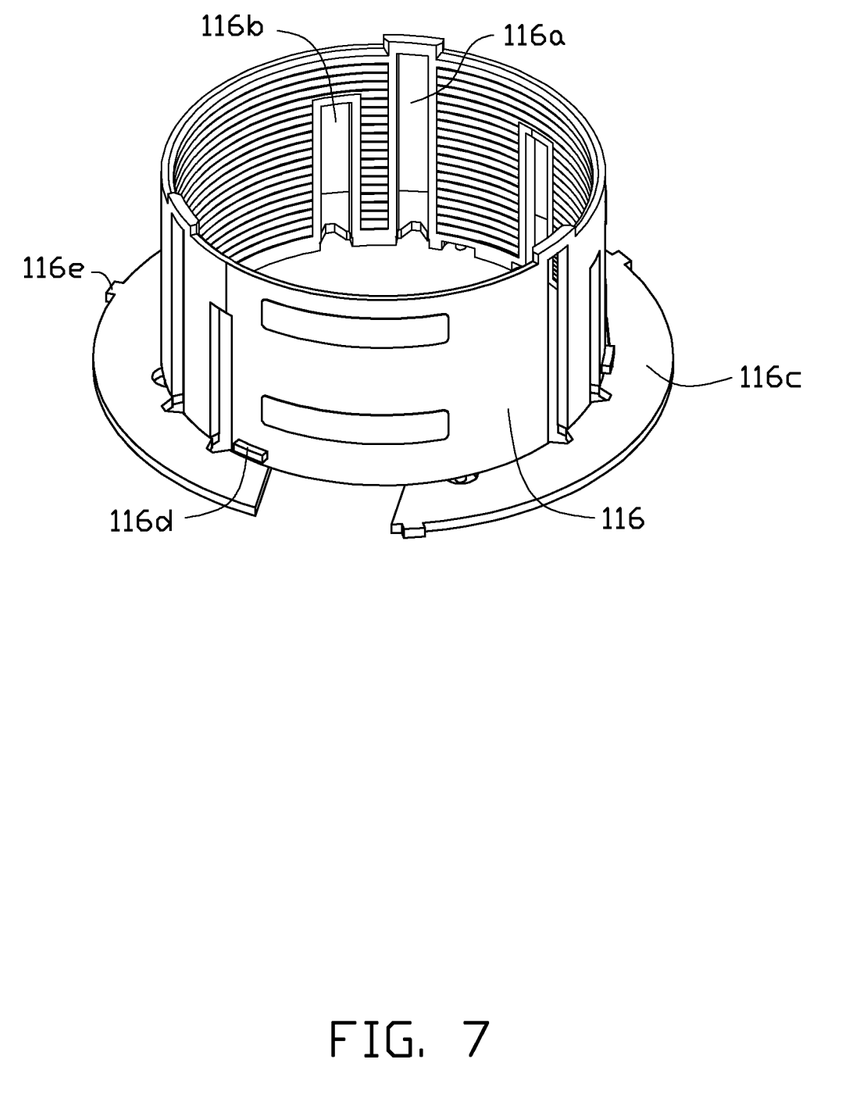
FIG. 7 is an enlarged view of the inner guiding barrel of the imaging device of FIG. 1.

The outer diameter of the inner guiding barrel 116 is less than the inner diameter of the cam barrel 115. Referring also to FIG. 7, the inner guiding barrel 116 defines a number of through sixth straight guiding grooves 116a corresponding to the number of first lens guiding grooves 115b and a number of through seventh straight guiding grooves 116b corresponding to the number of second lens guiding grooves 115c. The inner guiding barrel 116 includes a second stop plate 116c formed on an end thereof towards the image side. The second stop plate 116c includes a number of fourth protrusions 116e formed on a peripheral edge thereof corresponding to the number of fourth straight guiding grooves 113f. The inner guiding barrel 116 further includes a number of third engaging blocks 116d corresponding to the number of third engaging grooves 115d. The third engaging blocks 116d are formed on an outer surface of the inner guiding barrel 116 near the second stop plate 116c.

Figure 8:
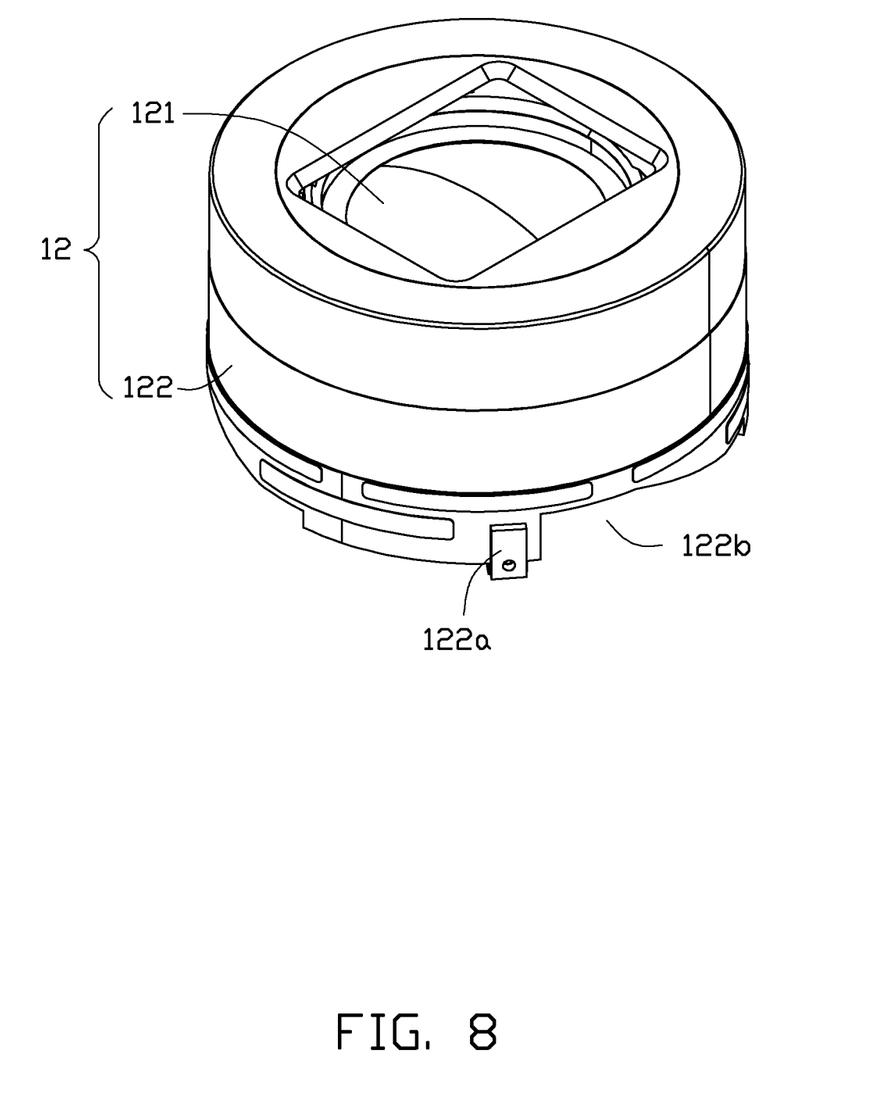
FIG. 8 is an enlarged view of the first lens unit of the imaging device of FIG. 1.

Referring also to FIG. 8, the first lens unit 12 includes a first lens group 121 and a first lens holder 122 for holding the first lens group 121. The first lens holder 122 includes a number of fifth protrusions 122a corresponding to the number of fifth straight guiding grooves 114b. The fifth protrusions 122a are formed on an outer surface of the first lens holder 122 and at an end of the first lens holder 122 towards the image side. The first lens holder 122 defines a number of inclined cutouts 122b in an end surface thereof facing toward the image side. The inclined cutouts 122b correspond with the connecting blocks 115e.

The second lens unit 13 includes a second lens group 131 and a second lens holder 132 for holding the second lens group 131. The second lens holder 132 includes a number of sixth protrusions 132a corresponding to the number of sixth straight guiding grooves 116a and the first lens guiding grooves 115b. The sixth protrusions 132a are formed on an outer surface of the second lens holder 132 at an end of the second lens holder 132 towards the image side.

The third lens unit 14 includes a third lens group 141 and a third lens holder 142 for holding the third lens group 141.

Figure 9:
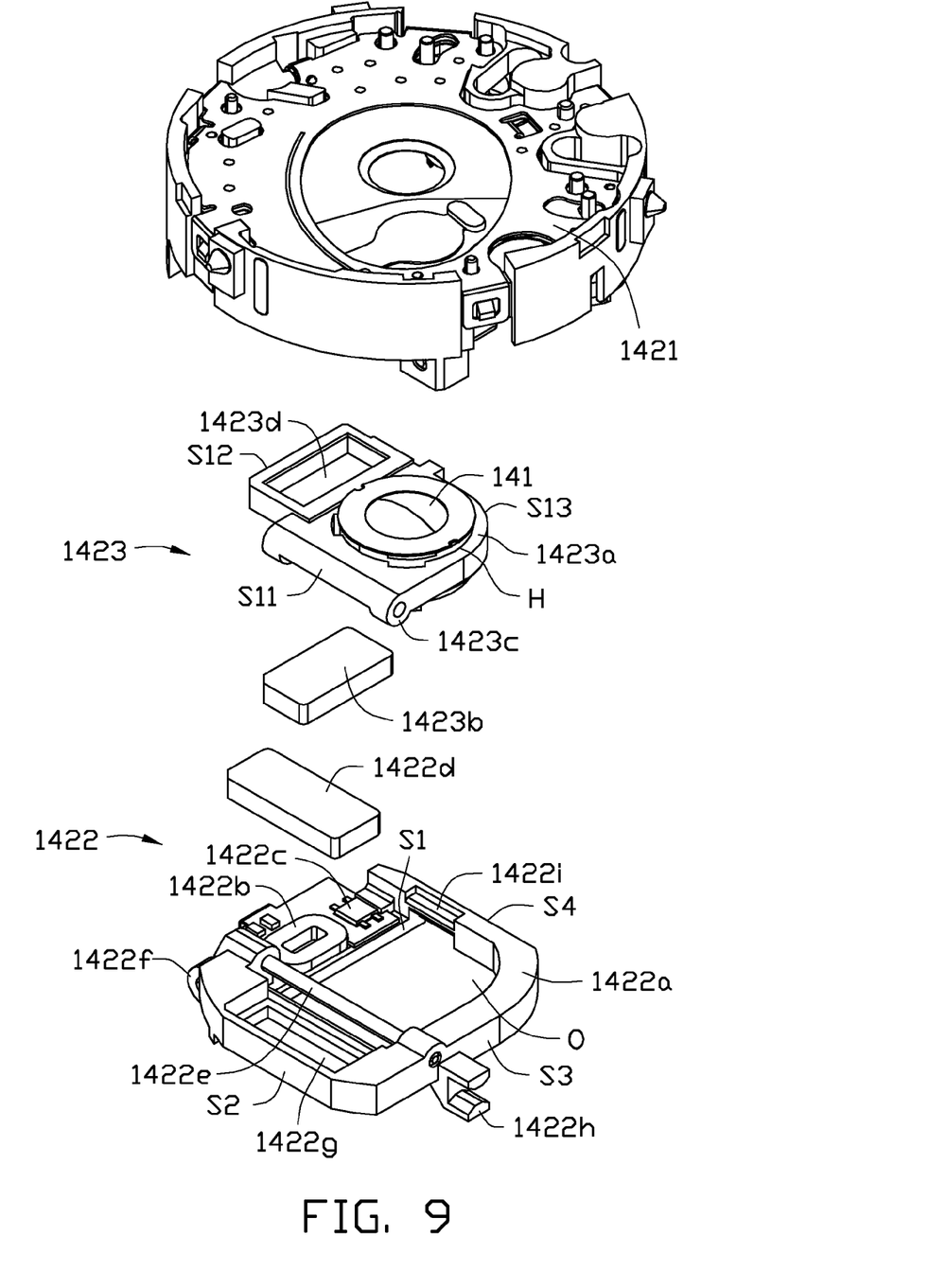
FIG. 9 is an exploded view of the third lens unit of the imaging device of FIG. 1, the third lens unit including a first magnet.
Figure 10:
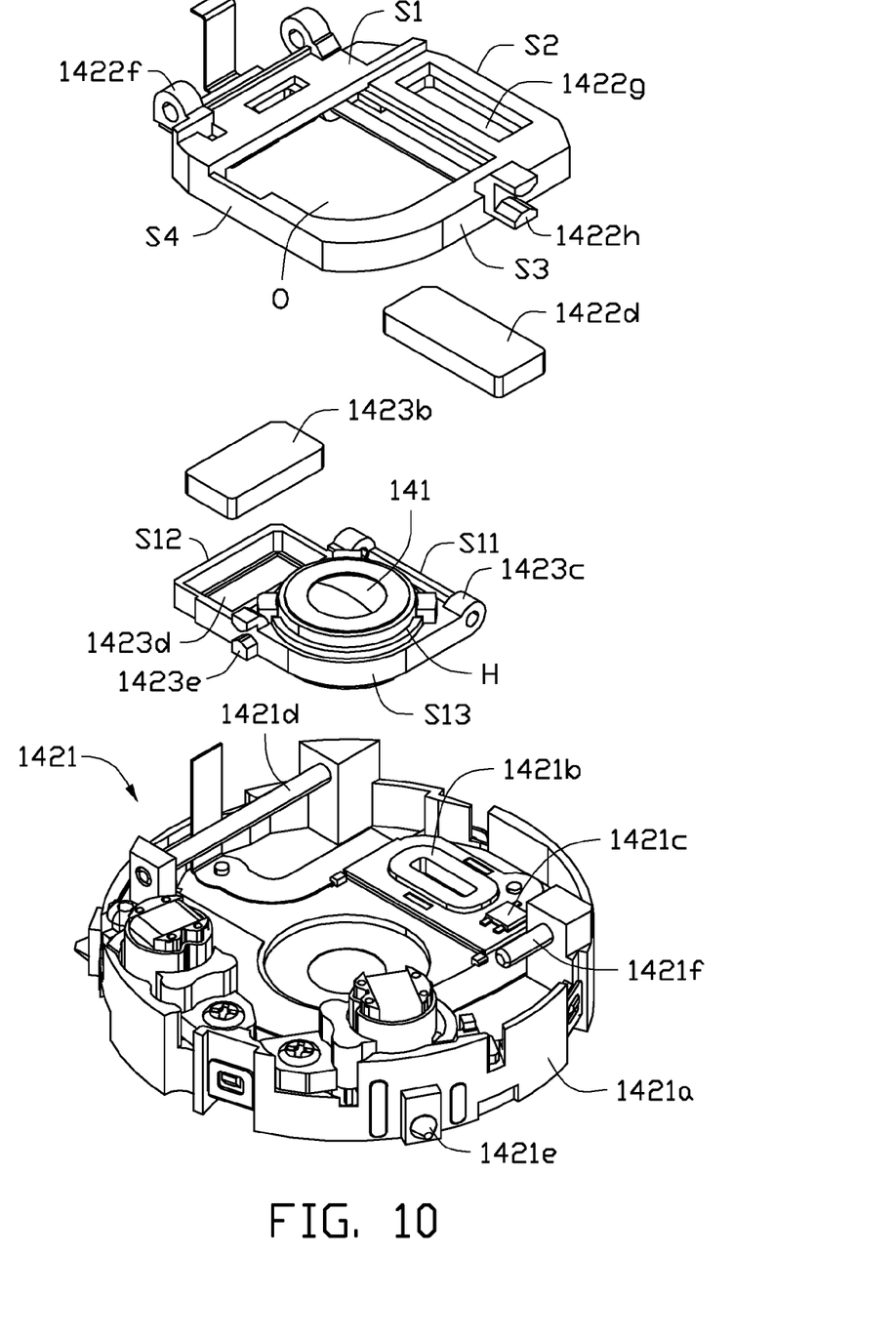
FIG. 10 is similar to FIG. 9 but viewing the third lens from another angle.

Referring to FIG. 9 and FIG. 10, the third lens holder 142 includes a movable barrel 1421 to carry the third lens group 141 along the optical axis, a first slidable member 1422 configured to carry the third lens group 141 along a first direction substantially perpendicular to the optical axis, and a second slidable member 1423 configured to carry the third lens group 141 along a second direction which is substantially perpendicular to the optical axis and substantially parallel to the first direction.

The movable barrel 1421 includes a main portion 1421a with a central opening (not labeled) defined therein, a first coil 1421b, a first Hall element 1421c, and a first guiding bar 1421d. The main portion 1421a includes a number of seventh protrusions 1421e corresponding to the number of seventh straight guiding grooves 116b and second lens guiding grooves 115c. The seventh protrusions 1421e are formed on an outer surface of the main portion 1421a at an end of the main portion 1421a towards the object side. The first coil 1421b is fixed on the main portion 1421a and is configured for driving the first slidable member 1422 along the first direction. The first Hall element 1421c is fixed on the main portion 1421a near the first coil 1421b and is configured for detecting any movement of the first slidable member 1422 in the first direction. The first guiding bar 1421d is positioned on the main portion 1421a and has a lengthwise direction substantially parallel to the first direction and is configured for guiding the first sliding member 1422 to slide along the first direction. Positioned on the movable barrel 1421 is a first auxiliary guiding bar 1421f substantially parallel to the first guiding bar 1421d. The first auxiliary guiding bar 1421f is shorter than the first guiding bar 1421d.

Figure 11:
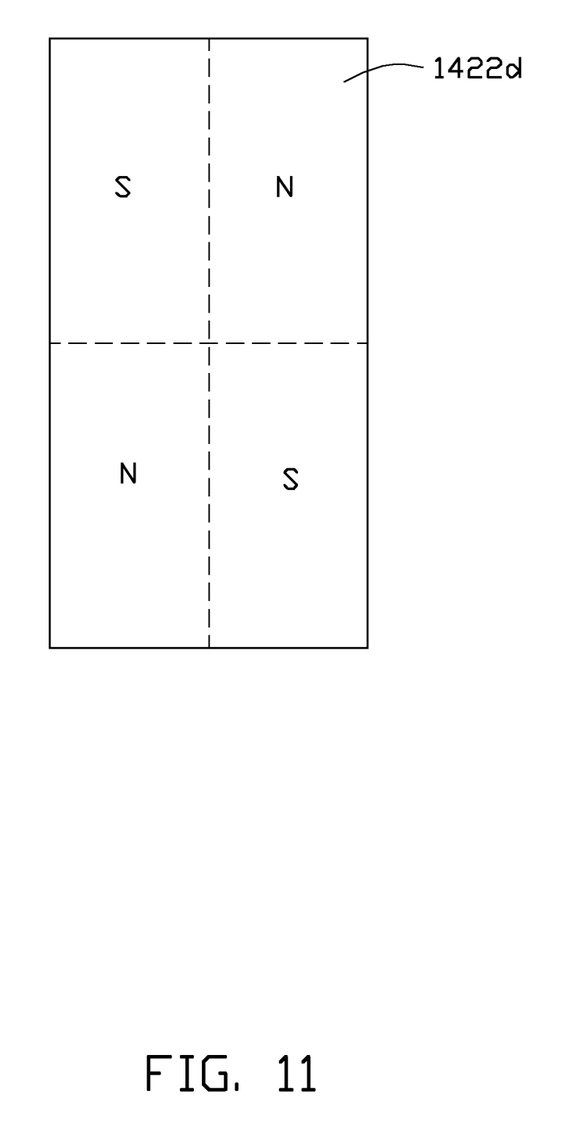
FIG. 11 is a schematic view of the first magnet of FIG. 9.

The first sliding member 1422 includes a first frame 1422a, a second coil 1422b, a second Hall member 1422c, a first magnet 1422d and a second guiding bar 1422e. The first frame 1422a includes a first side S1, a second side S2, a third side S3 and a fourth side S4. The sides S1, S2, S3 and S4, are connected end to end. The first side S1 is substantially parallel to the third side S3, the second side S2 is substantially parallel to the fourth side S4, and the first side S1 is substantially perpendicular to the fourth side S4. The first side S1, the second side S2, the third side S3 and the fourth side S4 cooperatively define a central opening O therebetween. The first frame 1422a includes a first yoke portion 1422f formed on a peripheral surface of the first side S1 and a first auxiliary yoke portion 1422h formed on a peripheral surface of the third side S3. The first frame 1422a defines a first mounting groove 1422g in the second side S2 corresponding to the first magnet 1422d. The second coil 1422 is fixed on the first side S1 and is configured for driving the second slidable member 1423 to slide along the second direction. The second Hall member 1422b is fixed on the first side S1 near the second coil 1422 and is configured for detecting any movement of the second slidable member 1423 along the second direction. The first magnet 1422 is substantially cuboid. Referring to FIG. 11, in this embodiment, the first magnet 1422 includes two north (N) poles and two south (S) poles. The N poles and the S poles alternate as if around a clock face, where the first and third quarters hold a N pole, and the second and fourth quarters hold a S pole. The second guiding bar 1422e is substantially parallel to the second side S2, and an end of the second guiding bar 1422e is connected to the first side S1 and another end to the third side S3. The second guiding bar 1422e is configured for guiding the second slidable member 1423 to slide along the second direction. The first frame 1422a further includes a second auxiliary guiding bar 1422i formed on an inner surface of the fourth side S4 substantially parallel to second guiding bar 1422e. The second auxiliary guiding bar 1422i is shorter than the second guiding bar 1422e.

The second slidable member 1423 includes a second frame 1423a and a second magnet 1423b. The second frame 1423a includes a first side S11, a second side S12 and a third side S13. The first side S11, second side S12 and third side S13 are connected end to end. The first side S11, second side S12 and third side S13 cooperatively define a fixing hole H therebetween for receiving and fixing the third lens group 141 therein. The first side S11 is substantially perpendicular to the second side S12, and the third side S13 is arc-shaped. The second frame 1423a includes a second yoke portion 1423c formed on a peripheral surface of the first side S11 and a second auxiliary yoke portion 1423e formed on a peripheral surface of the third side S13 near the second side S12. The second slidable member 1423 defines a second mounting groove 1423d in the second side S12 corresponding to the second magnet 1423b. The second magnet 1423b has a structure similar to that of the first magnet 1422d.

In assembly of the third lens unit 14, referring to FIG. 1, the first magnet 1422d is fixedly received in the first mounting groove 1422g, the first yoke portion 1422f is a sliding fit on the first guiding bar 1421d, and the first auxiliary yoke portion 1422h is a sliding fit on the first auxiliary bar 1421f. The second magnet 1423b is fixedly received in the second mounting groove 1423d, the second yoke portion 1423c is a sliding fit on the second guiding bar 1422e, and the second auxiliary yoke portion 1423e is a sliding fit on the second auxiliary guiding bar 1422i. In the assembled third lens unit 14, the first Hall member 1421c and the first coil 1421b are aligned with the first magnet 1422d along the optical axis, and the second Hall member 1422c and the second coil 1422b are aligned with the second magnet 1423b along the optical axis.

Referring again to FIG. 1, the fourth lens unit 15 includes a fourth lens group 151 and a fourth lens holder 152 for holding the fourth lens group 151. The fourth lens holder 152 carries the fourth lens group 151 along the optical axis of the zoom lens 10 to correctly focus the images of the objects onto the image sensing module 20.

The image sensing module 20 is configured for receiving and sensing images captured by the zoom lens 10. The image sensing module 20 can be charge coupled device (CCD) module or complementary metal oxide semiconductor (CMOS) module.

The first driving unit 30 drives the zoom lens 10 in or out. The first driving unit 30 includes a driving motor 31 and a transmission portion 32. The transmission portion 32 transmits the rotation of the driving motor 31 into moving the zoom lens 10. In this embodiment, the transmission portion 32 employs a gear-driven mechanism. The transmission portion 32 includes a driving gear 321 corresponding to the teeth portion 112b of the gear barrel 112, for driving the gear barrel 112.

The second driving portion 40 is configured for driving the fourth lens unit 15 along the optical axis.

Figure 12:
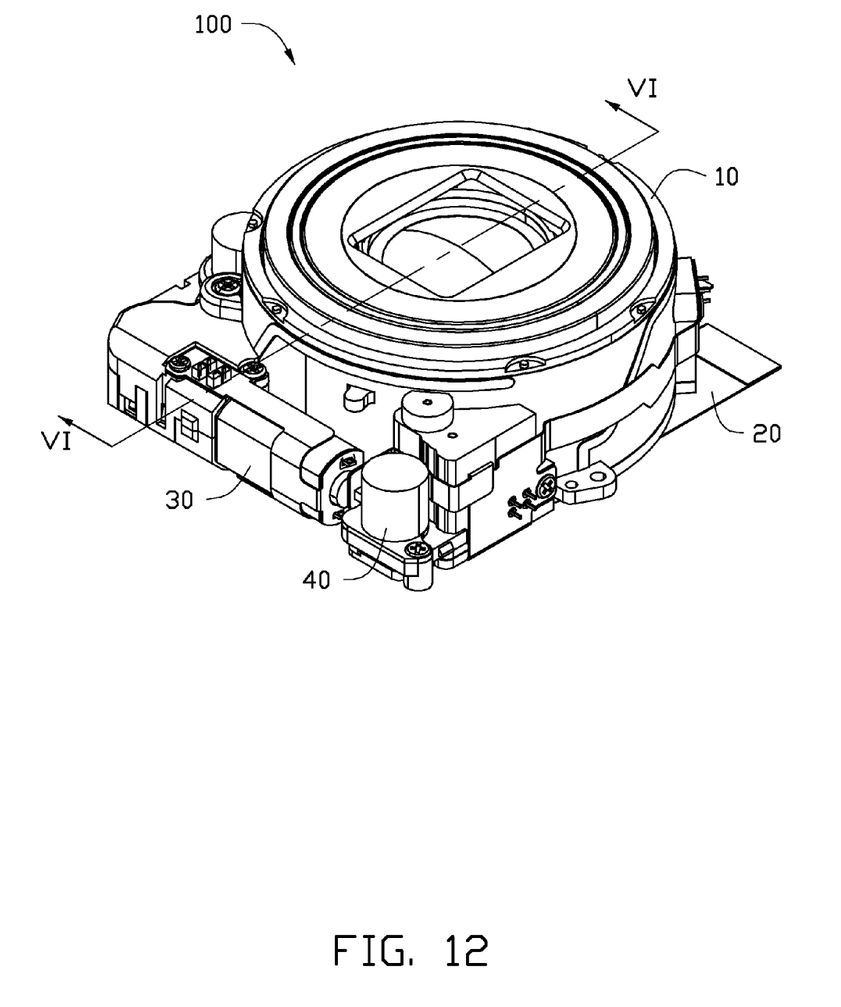
FIG. 12 is an assembled and isometric view of the imaging device of FIG. 1.
Figure 13:
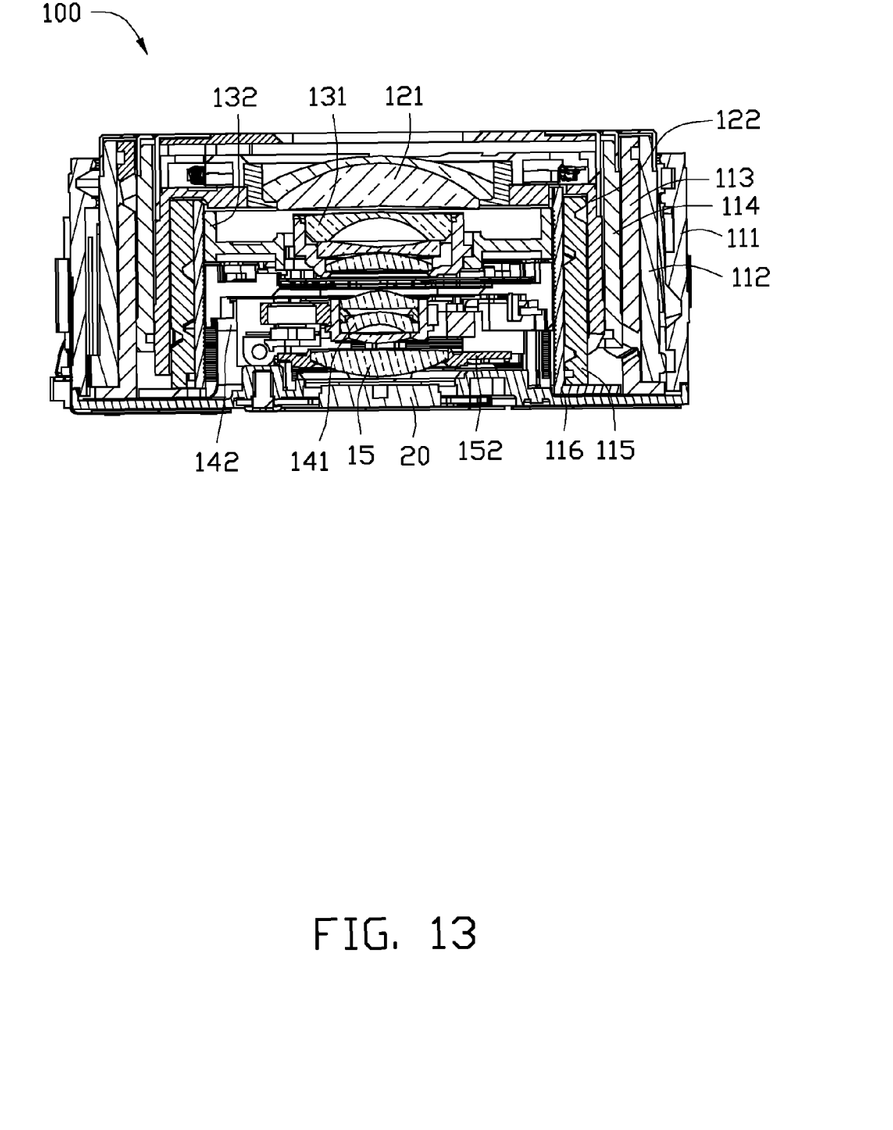
FIG. 13 is a sectional view along line VI-VI of the imaging device of FIG. 12.

Referring to FIG. 1, FIG. 12 and FIG. 13, in assembly of the imaging device 100, the gear barrel 112 is put into the fixed barrel 111, the first protrusions 112a are inserted into the first inclined guiding grooves 111b, and a part of the teeth portion 112b faces toward the entrance 111c. The outer guiding barrel 113 is put into the gear barrel 112, the first stop plate 113b resists on an end surface of the gear barrel 113 towards the image side, the first engaging blocks 112d are inserted into the first engaging groove 113d, and the second protrusions 113c mate with the corresponding first straight guiding grooves 111a. The front guiding barrel 114 is put into the outer guiding barrel 113, the guiding blocks 114a are manipulated into the corresponding third straight guiding grooves 113e. An object side end of the cam barrel 115 is put into the front guiding barrel 114, the third protrusions 115a pass through the corresponding second inclined guiding grooves 113a and insert themselves into the corresponding second straight guiding grooves 112c, and the second engaging blocks 115f are inserted into the corresponding second engaging grooves 114c. The first lens holder 122 is mounted between the cam barrel 115 and the front guiding barrel 114, the fifth protrusions 122a mate with the corresponding fifth straight guiding grooves 114b, and the connecting block 115e goes through the corresponding inclined cutouts 122b and resist on the first lens holder 122. An object side end of the inner guiding barrel 116 is put into the cam barrel 115, the second stop plate 116c resists on an image side end surface of the cam barrel 115, the third engaging blocks 116d engage with the corresponding third engaging grooves 115d, and the fourth protrusions 116e are inserted into the corresponding fourth straight guiding grooves 113f. The second lens holder 132 is received in the inner guiding barrel 116, the sixth protrusions 132a go through the corresponding sixth straight guiding grooves 116a and insert themselves into the corresponding first lens guiding grooves 115b. The third lens holder 142 is received in the inner guiding barrel 116, the seventh protrusions 1421e go through the corresponding seventh straight guiding grooves 116b and mate with the corresponding second lens guiding grooves 115c. The fourth lens unit 15 is received in the fixed barrel 111 and is movable along the optical axis.

In the assembled zoom lens 10, the gear barrel 112 and the cam barrel 115 can rotate about the optical axis and so move along the optical axis relative to the fixed barrel 111 and the outer guiding barrel 113. The inner guiding barrel 116, the front guiding barrel 114, the first lens unit 12, the second lens unit 13 and the third lens unit 14 can move along the optical axis relative to the fixed barrel 111.

The assembled zoom lens 10 is aligned with the image sensing module 20 along the optical axis, and the fixed barrel 111 is fixedly connected to the imaging module 20. The first driving unit 30 and the second driving unit 40 are fixed on the image sensing module 20. The driving gear 321 is inserted into the fixed barrel 111 through the entrance 111c and meshes with the teeth portion 112b of the gear barrel 112.

In use, the imaging device 100 zooms in and zooms out by means of the movements of the first lens unit 12, the second lens unit 13 and the third lens unit 14 along the optical axis. In detail, the first driving unit 30 drives the gear barrel 112 to rotate about the optical axis, the first protrusions 112a move along the first inclined guiding grooves 111b, thus the gear barrel 112 moves along the optical axis at the same time. During this movement, the gear barrel 112 carries the outer guiding barrel 113 along the optical axis. The cam barrel 115 rotates about the optical axis driven by the gear barrel 112, at the same time, the second protrusions 115a move along the second inclined guiding grooves 113a to drive the cam barrel 115 along the optical axis. During this movement, the cam barrel 115 drives the inner barrel 116 and the first lens holder 122 along the optical axis. The second lens holder 132 and the third lens holder 142 move along the optical axis under the driving of, and limitation of, the cam barrel 115 and the inner guiding barrel 116.

The imaging device 100 also moves the third lens group 141 along the first direction and/or the second direction to correct image blur due to any shaking of the imaging device 100 during the capturing of images.

In detail, the first magnet 1422d forms a first magnetic field around the first coil 1421b and the first Hall member 1421c, and the second magnet 1423b forms a second magnetic field around the second coil 1422b and the second Hall member 1422c. If no shaking occurs, the intensities of the first magnetic field and the second magnetic field are constant. If any shakes happen, the first slidable member 1422 may deviate from its original position along the first direction, and/or the second slidable member 1423 may deviate from its original position along the second direction.

If the first slidable member 1422 deviates along the first direction, the intensity of the first magnetic field around the first Hall member 1421c will accordingly change, then the first Hall member 1421c can detect the changing of the intensity of the first magnetic field around the first Hall member 1421c. Therefore, the amount of any deviation of the first slidable member 1422 along the first direction can be calculated according the changing of the intensity of the first magnetic field detected by the first Hall member 1421c, and a compensating offset can be calculated for the first slidable member 1422. If the second slidable member 1423 deviates along the second direction, the intensity of second magnetic field around the second Hall member 1423c will accordingly change, then the second Hall member 1422c can detect the changing of the intensity of the second magnetic field around the second Hall member 1422c. Therefore, any deviation of the second slidable member 1423 along the second direction can be calculated according to the changing of the intensity of the second magnetic field detected by the second Hall member 1422c, and a compensating offset for the second slidable member 1423 can be calculated.

The first coil 1421b can produce a magnetic force to alter the natural position(s) of the first slidable member 1422 so as to compensate for the deviation, by outputting a current calculated to negate the deviation of the first slidable member 1422. The second coil 1422b can function in exactly the same manner in relation to the second slidable member 1423. By these means, image blur because of any shaking of the image device 100 can be prevented.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A zoom lens comprising:
a first lens unit comprising a first lens group, a second lens unit comprising a second lens group, a third lens unit comprising a third lens group and a fourth lens unit comprising a fourth lens group;
wherein the first lens unit, second lens unit, third lens unit and fourth lens unit are arranged in an order from an object side to an image side of the zoom lens and align with each other along an optical axis of the zoom lens, the first lens unit, second lens unit and third lens unit move along the optical axis to zoom in or zoom out, the third lens unit comprises a movable barrel movable along the optical axis, a first slidable member slidably connected to the movable barrel along a first direction substantially perpendicular to the optical axis and a second slidable member slidably connected to the first slidable member along a second direction substantially perpendicular to the optical axis and the first direction, the third lens group is fixedly held by the second slidable member, the movable barrel comprises a first Hall member and a first coil fixed thereon, the first slidable member comprises a second Hall member, a second coil and a first magnetic fixed thereon, the first magnet is aligned with the first coil and the first Hall member along the optical axis, the second slidable member comprises a second magnet, the second magnet is aligned with the second coil and the second Hall member along the optical axis, the first Hall member is configured for detecting a deviation of the first slidable member along the first direction, the second Hall member is configured for detecting a deviation of the second slidable member along the second direction, the first coil is configured for driving the first slidable member to move along the first direction for compensating the deviation of the first slidable member, and the second coil is configured for driving the second slidable member to along the second direction for compensating the deviation of the second slidable member.

2. The zoom lens as claimed in claim 1, wherein the movable barrel comprises a first direction guiding bar positioned thereon, a lengthwise direction of the first direction guiding bar is substantially parallel to the first direction, the first direction guiding bar is configured for guiding the first slidable member to slide along the first direction.

3. The zoom lens as claimed in claim 2, wherein the first slidable member comprises a first yoke portion positioned on a peripheral surface thereof, the first yoke portion is slidably mounted on the first direction guiding bar.

4. The zoom lens as claimed in claim 2, wherein the movable barrel comprises a first auxiliary guiding bar positioned thereon, a lengthwise direction of the first auxiliary guiding bar is substantially parallel to the lengthwise direction of the first direction guiding bar, the first slidable member is slidably connected to the first auxiliary guiding bar.

5. The zoom lens as claimed in claim 4, wherein the first slidable member comprises a first auxiliary yoke portion positioned on a peripheral surface thereof, the first auxiliary yoke portion is slidably mounted on the first direction guiding bar.

6. The zoom lens as claimed in claim 1, wherein the first magnet and the second magnet each comprise two S poles and two N pole, the S poles and the N poles are alternatively arrange.

7. The zoom lens as claimed in claim 1, wherein the first slidable member comprises a second direction guiding bar positioned thereon, a lengthwise direction of the second direction guiding bar is substantially parallel to the second direction, the second direction guiding bar is configured for guiding the second slidable member to slide along the second direction.

8. The zoom lens as claimed in claim 7, wherein the second slidable member comprises a second yoke portion positioned on a peripheral surface thereof, the second yoke portion is slidably mounted on the second direction guiding bar.

9. The zoom lens as claimed in claim 7, wherein the first slidable member comprises a second auxiliary guiding bar positioned thereon, a lengthwise direction of the second auxiliary guiding bar is substantially parallel to the lengthwise direction of the second direction guiding bar, the second slidable member is slidably connected to the second auxiliary guiding bar.

10. The zoom lens as claimed in claim 9, wherein the second slidable member comprises a second auxiliary yoke portion positioned on a peripheral surface thereof, the second auxiliary yoke portion is slidably mounted on the second direction guiding bar.

11. An imaging device comprising:
a zoom lens for capturing images of objects, comprising:
a first lens unit comprising a first lens group, a second lens unit comprising a second lens group, a third lens unit comprising a third lens group and a fourth lens unit comprising a fourth lens group; and a image sensing module for sensing the images captured by the zoom lens;

wherein the first lens unit, second lens unit, third lens unit and fourth lens unit are arranged in an order from an object side to an image side of the zoom lens and align with each other along an optical axis of the zoom lens, the first lens unit, second lens unit and third lens unit move along the optical axis to zoom in or zoom out, the third lens unit comprises a movable barrel movable along the optical axis, a first slidable member slidably connected to the movable barrel along a first direction substantially perpendicular to the optical axis and a second slidable member slidably connected to the first slidable member along a second direction substantially perpendicular to the optical axis and the first direction, the third lens group is fixedly held by the second slidable member, the movable barrel comprises a first Hall member and a first coil fixed thereon, the first slidable member comprises a second Hall member, a second coil and a first magnetic fixed thereon, the first magnet is aligned with the first coil the first Hall member along the optical axis, the second slidable member comprises a second magnet, the second magnet is aligned with the second coil and the second Hall member along the optical axis, the first Hall member is configured for detecting a deviation of the first slidable member along the first direction, the second Hall member is configured for detecting a deviation of the second slidable member along the second direction, the first coil is configured for driving the first slidable member to move along the first direction for compensating the deviation of the first slidable member, and the second coil is configured for driving the second slidable member to along the second direction for compensating the deviation of the second slidable member.

* * * * *